United States Patent
Nilsson

(10) Patent No.: US 11,622,338 B2
(45) Date of Patent: Apr. 4, 2023

(54) TRANSMISSION OF SYNCHRONIZATION SIGNALS

(71) Applicant: Telefonaktiebolaget LM Ericsson (publ), Stockholm (SE)

(72) Inventor: Andreas Nilsson, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 927 days.

(21) Appl. No.: 16/341,335

(22) PCT Filed: Mar. 26, 2019

(86) PCT No.: PCT/EP2019/057539
§ 371 (c)(1),
(2) Date: Apr. 11, 2019

(87) PCT Pub. No.: WO2020/192892
PCT Pub. Date: Oct. 1, 2020

(65) Prior Publication Data
US 2021/0368456 A1    Nov. 25, 2021

(51) Int. Cl.
*H04W 56/00*    (2009.01)
*H04B 7/06*    (2006.01)
*H04B 7/10*    (2017.01)
*H04L 27/26*    (2006.01)
*H04B 17/382*    (2015.01)

(52) U.S. Cl.
CPC ........ *H04W 56/001* (2013.01); *H04B 7/0617* (2013.01); *H04B 7/10* (2013.01); *H04L 27/261* (2013.01); *H04L 27/2655* (2013.01); *H04B 17/382* (2015.01)

(58) Field of Classification Search
CPC ....................................................... H04L 27/02
See application file for complete search history.

(56) References Cited

U.S. PATENT DOCUMENTS

| 2002/0034968 A1* | 3/2002 | Fischer | H04B 7/10 |
| | | | 455/562.1 |
| 2003/0124994 A1* | 7/2003 | Ylitalo | H04B 7/0408 |
| | | | 455/91 |
| 2003/0174687 A1* | 9/2003 | Ball | H04W 52/32 |
| | | | 370/345 |

(Continued)

FOREIGN PATENT DOCUMENTS

| WO | 2018145737 A1 | 8/2018 |
| WO | 2018206666 A1 | 11/2018 |
| WO | 2018/231014 A1 | 12/2018 |

OTHER PUBLICATIONS

International Search Report issued in International Application No. PCT/EP2019/057539, dated Oct. 16, 2019 (5 pages).

(Continued)

*Primary Examiner* — Alpus Hsu
*Assistant Examiner* — Camquyen Thai
(74) *Attorney, Agent, or Firm* — Rothwell, Figg, Ernst & Manbeck, P.C.

(57) ABSTRACT

There is provided mechanisms for transmission of synchronization signals. A method is performed by a network node. The method comprises transmitting polarized bursts of SSB in beams. One SSB is transmitted per each beam in each burst. Polarization of at least one of the SSBs changes between two consecutive bursts of the SSBs.

17 Claims, 8 Drawing Sheets

(56) References Cited

U.S. PATENT DOCUMENTS

| | | | |
|---|---|---|---|
| 2003/0202537 A1* | 10/2003 | Rogerson | H03K 5/1508 |
| | | | 370/478 |
| 2009/0262786 A1* | 10/2009 | Hammersley | H04B 7/10 |
| | | | 375/136 |
| 2013/0142136 A1* | 6/2013 | Pi | H04B 7/1555 |
| | | | 370/329 |
| 2016/0302090 A1* | 10/2016 | Parkvall | H04B 7/068 |
| 2016/0316444 A1* | 10/2016 | Ringh | H04L 5/0048 |
| 2018/0124718 A1* | 5/2018 | Ng | H04B 7/15 |
| 2018/0241494 A1* | 8/2018 | Chendamarai Kannan | |
| | | | H04B 7/0695 |
| 2019/0014493 A1* | 1/2019 | Kim | H04B 17/318 |
| 2019/0028984 A1 | 1/2019 | Lee et al. | |
| 2019/0081714 A1* | 3/2019 | Xiang | H04W 24/10 |
| 2019/0116500 A1* | 4/2019 | Bendlin | H04W 64/003 |
| 2019/0200389 A1* | 6/2019 | Li | H04W 72/1231 |

OTHER PUBLICATIONS

Sony, "Considerations on multi-beam operation", 3GPP TSG RAN WG1 Ad-Hoc Meeting 1901, R1-1900378, Taipei, Taiwan, Jan. 21-25, 2019 (8 pages).

* cited by examiner

TRANSMISSION OF SYNCHRONIZATION SIGNALS

CROSS REFERENCE TO RELATED APPLICATION(S)

This application is a 35 U.S.C. § 371 National Stage of International Patent Application No. PCT/EP2019/057539, filed Mar. 26, 2019, designating the United States.

TECHNICAL FIELD

Embodiments presented herein relate to a method, a network node, a computer program, and a computer program product for transmission of synchronization signals.

BACKGROUND

Synchronization Signal Block (SSB) is a signal that is broadcast over the New Radio (NR) air interface from network nodes on the network side to terminal devices on the user side. The SSB is intended to enable initial synchronization of the terminal devices, provide basic system information to the terminal devices as used for initial access, and allow the terminal device to perform mobility measurements. The structure of an SSB is illustrated in FIG. 1. In particular, FIG. 1 schematically illustrates time/frequency resources for transmitting one the SSB (where PRB is short for Physical resource Block). Each SSB consist of four orthogonal frequency-division multiplexing (OFDM) symbols, in FIG. 1 denoted OFDM symb 1, OFDM symb 2, OFDM symb 3, and OFDM symb 4. Time/frequency resources for an NR Primary Synchronization Signal (PSS) are located in the first OFDM symbol and are used for finding a coarse time/frequency synchronization. Time/frequency resources for an NR Physical Broadcast Channel (PBCH) are located in the second, third and fourth OFDM symbol and contain necessary system information bits. Time/frequency resources for an NR Secondary Synchronization Signal (SSS) are located in the third OFDM symbol and are used for establishing a finer time/frequency synchronization.

The PSS and SSS of the SSB are transmitted over 127 subcarriers, where the subcarrier spacing could be 15 kHz or 30 kHz for carrier frequencies below 6 GHz, and 120 kHz or 240 kHz for carrier frequencies above 6 GHz. For low carrier frequencies (such as carrier frequencies below 6 GHz), each network node might transmit one cell-wide SSB that thus covers the whole cell served by the network node, whilst for higher carrier frequencies (such as carrier frequencies above 6 GHz) each network node might transmit several beamformed SSBs to attain coverage over the whole cell. In some examples the maximum number of SSB per cell are 4 for carrier frequencies below 3 GHz, 8 for carrier frequencies in the interval 3-6 GHz, and 64 for carrier frequencies above 6 GHz. The SSBs might be transmitted in an SSB burst which could last up to 5 ms. The periodicity of the SSB burst might be configurable. In some examples the periodicity is 5, 10, 20, 40, 80, or 160 ms.

As mentioned above, terminal devices could use SSBs for mobility (i.e. cell selection) purposes. The terminal device might then perform measurements of reference signal received power (RSRP) on the SSS of the SSB. However, it could be difficult for the terminal devices to obtain accurate RSRP values when measuring on the SSS.

Hence, there is still a need for an improved cell selection procedure.

SUMMARY

An object of embodiments herein is to provide efficient transmission of synchronization signals enabling efficient cell selection.

According to a first aspect there is presented a method for transmission of synchronization signals. The method is performed by a network node. The method comprises transmitting polarized bursts of SSB in beams. One SSB is transmitted per each beam in each burst. Polarization of at least one of the SSBs changes between two consecutive bursts of the SSBs.

According to a second aspect there is presented a network node for transmission of synchronization signals. The network node comprises processing circuitry. The processing circuitry is configured to cause the network node to transmit polarized bursts of SSB in beams. One SSB is transmitted per each beam in each burst. Polarization of at least one of the SSBs changes between two consecutive bursts of the SSBs.

According to a third aspect there is presented a network node for transmission of synchronization signals. The network node comprises a transmit module configured to transmit polarized bursts of SSB in beams. One SSB is transmitted per each beam in each burst. Polarization of at least one of the SSBs changes between two consecutive bursts of the SSBs.

According to a fourth aspect there is presented a computer program for transmission of synchronization signals, the computer program comprising computer program code which, when run on a network node, causes the network node to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously this transmission of synchronization signals enables efficient cell selection for terminal devices receiving the synchronization signals.

Advantageously this reduces the risk of polarization mismatching. In turn, this reduces the risk of erroneous cell-selection. Also the risk of unwanted handovers due to, for example, rotation of the terminal device are reduced, which otherwise would cause unnecessary overhead signaling.

Advantageously this is achieved with low implementation effort, complexity, and processing need.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 2:
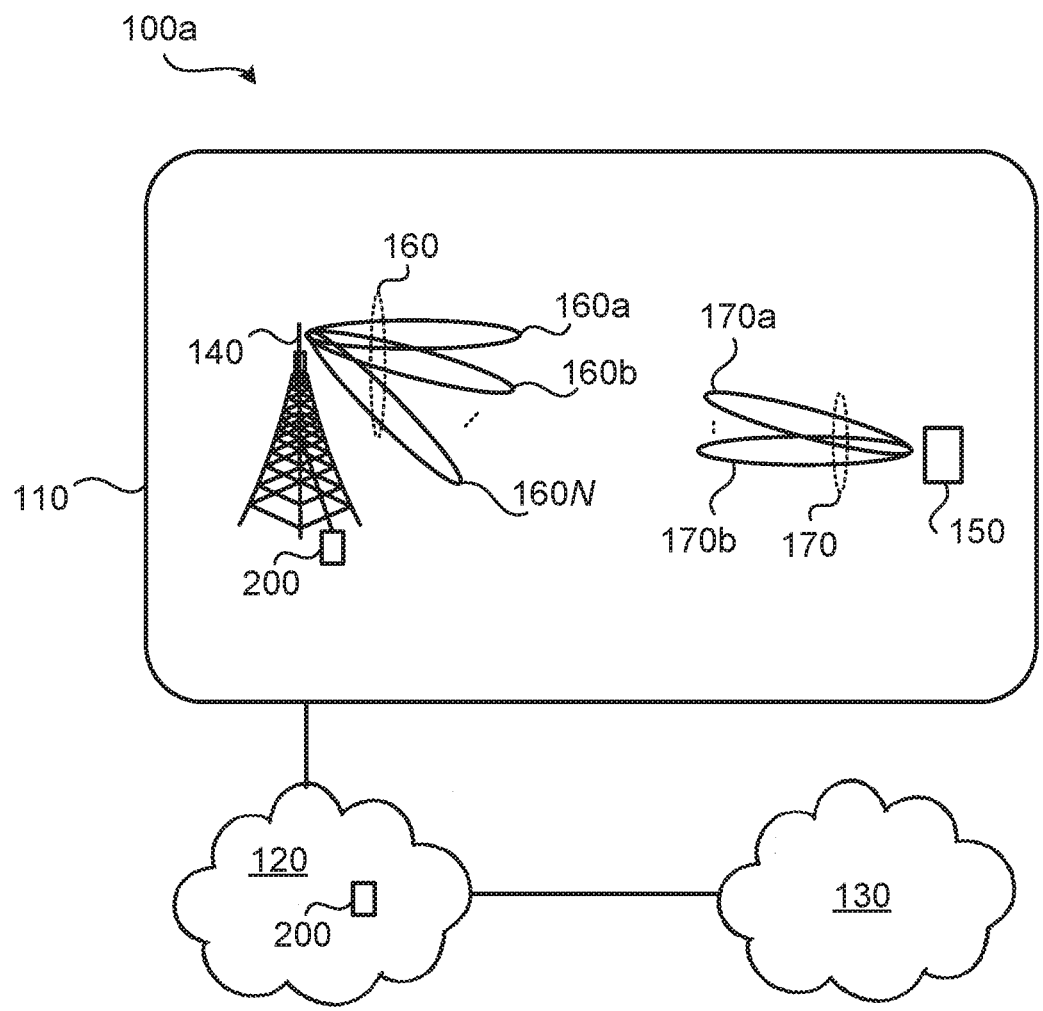
FIGS. 2 and 3 are schematic diagrams illustrating communications networks according to embodiments.

FIG. 2 is a schematic diagram illustrating a communications network 100a where embodiments presented herein can be applied. The communications network 100 could be a third generation (3G) telecommunications network, a fourth generation (4G) telecommunications network, or a fifth (5G) telecommunications network and support any 3GPP telecommunications standard, where applicable.

The communications network 100 comprises a network node 200 configured to provide network access to at least one terminal device 150 in a radio access network 110. The radio access network 110 is operatively connected to a core network 120. The core network 120 is in turn operatively connected to a service network 130, such as the Internet. The terminal device 150 is thereby enabled to, via the network node 200, access services of, and exchange data with, the service network 130.

The network node 200 comprises, is collocated with, is integrated with, or is in operational communications with, a transmission and reception point (TRP) 140. The network node 200 (via its TRP 140) and the terminal device 150 are configured to communicate with each other in respective sets of beams 160, 170, where, as illustrated in FIG. 2, the set of beams 160 consists of N individual beams 160a, 160b, . . . , 160N, and the set of beams 170 at least comprises individual beams 170a, 170b.

Examples of network nodes 200 are radio access network nodes, radio base stations, base transceiver stations, Node Bs, evolved Node Bs, g Node Bs, access points, and access nodes, and backhaul nodes. Examples of terminal devices 150 are wireless devices, mobile stations, mobile phones, handsets, wireless local loop phones, user equipment (UE), smartphones, laptop computers, tablet computers, network equipped sensors, network equipped vehicles, and so-called Internet of Things devices.

As disclosed above there is a need for an improved cell selection procedure. In further detail, as mentioned above, terminal devices 150 could use SSBs for mobility (i.e. cell selection) purposes using measurements of RSRP. The terminal device 150 might filter the measurements of RSRP as obtained from SSBs received from one or more network nodes 200 using layer 3 filtering (as specified in Section 5.5.3.2 of 3GPP TS 38.331 "NR; Radio Resource Control (RRC); Protocol specification", Release 15, version 15.4.0, dated 14 Jan. 2019) according to the following:

$$F_i = (1-a) \cdot F_{i+1} + a \cdot M_i \qquad \text{Equation 1}$$

In Equation 1, $M_i$ is the current received measurement of RSRP (i.e., the measurement of RSRP at time index i), $F_i$ is the updated filtered measurement result (i.e., the filtered measurement result at time index i), and $F_{i-1}$ is the most previous filtered measurement result (i.e., the filtered measurement result at time index i-1). The parameter "a" defines how much of the current measurement should be weighted compared to previous measurements. The parameter "a" therefore typically takes a value between 0 and 1. With a reasonable parameter setting of "a" the mobility measurement used for cell-selection is filtered over time to remove fast fading effects that possibly could cause ping-pong effects (i.e. unwanted handovers that "moves" one terminal device 150 back and forth between two (or more) serving network node S 200).

The reporting of the mobility measurements from the terminal device 150 to the network node 200 can be either periodic or event based. For periodic reporting the network node 200 configures the terminal device 150 to report the mobility measurements periodically for all neighbouring cells detected on the associated frequency where the terminal device 150 reports up to "maxCellReport" number of cells. For event triggered report the terminal device 150 is configured to report mobility measurements for all cells defined by the parameter "triggeredCellsList", again up to "maxCellReport" number of cells. The even trigger report is signalled from the terminal device 150 when a number of criteria are met, as described in Section 5.5.4 of aforementioned document 3GPP TS 38.331. In case the network node 200 detects (through a mobility report from the terminal device 150) that a neighbouring cell is stronger than serving cell it can initiate a handover process for the terminal device 150. A handover process generally requires quite much signalling and overhead and unnecessary handovers should be avoided as much as possible.

Since the SSS only covers 127 subcarriers and that the subcarrier spacing for carrier frequencies below 6 GHz could be either 15 kHz or 30 kHz, the total bandwidth for the SSS becomes rather small (around 2 MHz-4 MHz) and might hence be rather sensitive to frequency selective behavior in the radio propagation channel between the TRP 140 and the terminal device 150 (for example down fading of certain polarizations over a certain frequency band etc.). In addition, the SSB is only transmitted on a single port (i.e.

with a single polarization), which means that polarization mismatch might occur between the network node 200 and the terminal device 200. This might lead to terminal devices establishing, or at least seeking to establishing, a connection to the erroneous network node 200.

Due to the physical geometry of the terminal device 150 the currents of the antennas might be limited in certain directions which means that the antenna gain for the polarization in those directions become very small. As an illustrative example, if a common terminal device 150, which generally has the physical geometry of a relatively flat cuboid, is held in a horizontal position, the antenna gain will be smaller, or even much smaller, for the vertical polarization than for the horizontal polarization (in all directions). Then, in case the network node 200 transmits an SSB with vertical polarization, the terminal device 150 will have very low RSRP for that SSB, unless the radio propagation channel shifts the polarization state of the transmitted signal. At mmWave frequencies, however, the cells are assumed to be rather small due to poor propagation properties and it is therefore expected that the line of sight (LOS) probability to terminal device 150 is rather high. For LOS conditions the polarization state is to large extent expected to be maintained in the radio propagation channel between the TRP 140 and the terminal device 150.

Further, different polarizations might have very different measured RSRP. For example, the beam for which strongest RSRP can be measured in one polarization might be the weakest when measuring the RSRP in the orthogonal polarization. This means that depending on which polarization is used for the SSB, the terminal device 150 might experience different levels of RSRP. This in turn might result in that the terminal device 150 will be connected to different cells depending on for which polarization the RSRP of the SSB is measured. Further, if the terminal device 150 is rotated, or pivoted, such that it changes the polarization state of its receive antenna patterns, an unwanted and unnecessary handover might be initiated.

Figure 3:
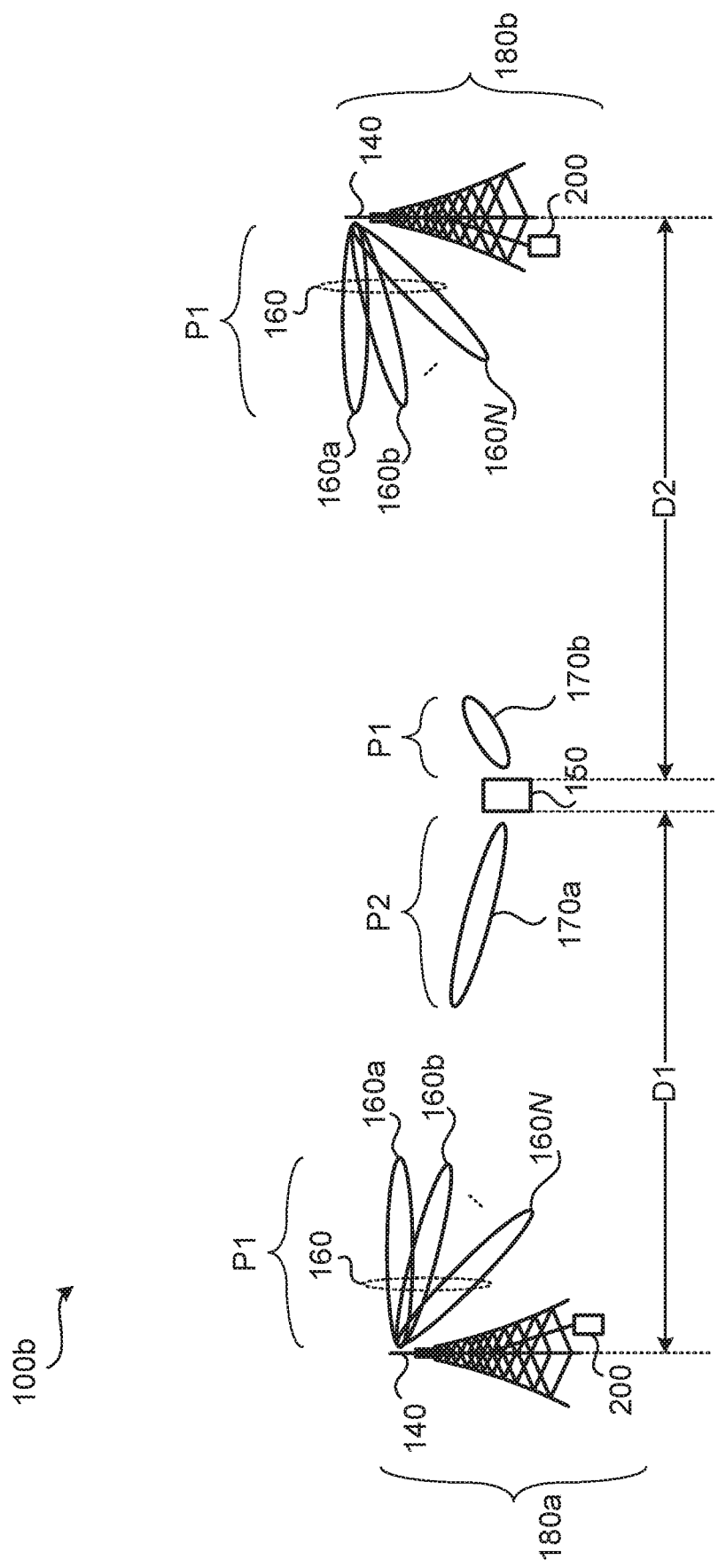

FIG. 3 is a schematic diagram illustrating a communications network 100b comprising two sites 180a, 180b, where each site 180a, 180b comprises a network node 200 and TRP 140 as disclosed above with reference to FIG. 2. A terminal device 150 is located in between the sites 180a, 180b at a distance D1 from the TRP 140 of site 180a and at a distance D2 from the TRP 140 of site 180b. It is in this example assumed that D1<D2 which would indicate that the path gain is higher to the TRP 140 of site 180a than to the TRP 140 of site 180b. In the illustrative example of FIG. 3 it is assumed that SSBs of polarization P1 is transmitted from both sites. In the illustrative example of FIG. 3 P1 is further assumed to define vertical polarization, and P2 is assumed to define horizontal polarization. The terminal device 150 is further assumed to be placed in a horizontal position, which typically means that the antenna gain, as illustrated by beam 170b, for the vertical polarization (i.e., P1) is lower than for the horizontal polarization (i.e., P2), as illustrated by beam 170a. In this respect, the radiation pattern and polarization state is typically quite random at the terminal device 15o, and in this case the radiation pattern implies that beams 170a, 170b for vertical and horizontal polarization are pointing in opposite directions. Since the beam 170b for the vertical polarization is pointing in direction towards site 180b a connection, as resulting from the aforementioned mobility measurements, will be established between the terminal device 150 and the network node 200 of site 180b. However, it would have been better if instead a connection would have been established between the terminal device 150 and the network node 200 of site 180a, although for the aforementioned reasons this will not be the case.

The embodiments disclosed herein therefore relate to mechanisms for transmission of synchronization signals. In order to obtain such mechanisms there is provided a network node 200, a method performed by the network node 200, a computer program product comprising code, for example in the form of a computer program, that when run on a network node 200, causes the network node 200 to perform the method.

Figure 4:
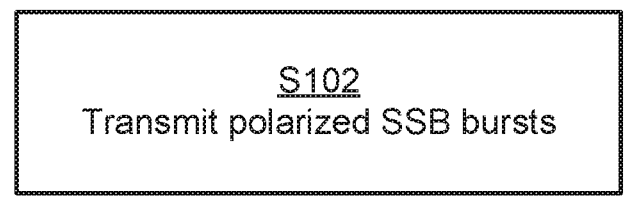
FIG. 4 is a flowchart of a method according to an embodiment.

FIG. 4 is a flowchart illustrating an embodiment of a method for transmission of synchronization signals. The methods are performed by the network node 200. The methods are advantageously provided as computer programs 920.

The network node transmits the SSBs using different polarizations P1, P2. In particular, the network node 200 is configured to perform step S102:

S102: The network node 200 transmits polarized bursts of SSBs in beams 160. One SSB is transmitted per each beam 160a:160N in each burst. The polarization P1, P2 of at least one of the SSBs (i.e., the polarization according to which the at least one of the SSBs is transmitted) changes between two consecutive bursts of the SSBs.

Thereby, instead of the serving cell for the terminal device 150 being selected based on strongest RSRP for SSBs transmitted in one polarization, the serving cell is enabled to be selected based on highest RSRP based on SSBs transmitted in two polarizations. This will reduce the risk of polarization mismatching and hence reduce the risk of erroneous cell selection for the terminal device 150. Since the terminal device 150 is configured to average the mobility measurements over multiple SSB bursts (as long as the parameter "a" in Equation 1 is smaller than 1), the terminal device 150 will obtain a value of the RSRP of the SSB that is averaged over two polarization (where how much the RSRP as measured for each polarization is weighted in the averaging depends on the value of "a" in accordance with Equation 1). This will avoid the situation resulting in erroneous cell selection as disclosed above with reference to FIG. 3.

Embodiments relating to further details of transmission of synchronization signals as performed by the network node 200 will now be disclosed.

There may be different ways transmit the SSBs such that one SSB is transmitted per each beam 160a:160N in each burst, and the polarization P1, P2 of at least one of the SSBs changes between two consecutive bursts of the SSBs. Different embodiments relating thereto will now be described in turn with reference to FIG. 5.

Figure 5:
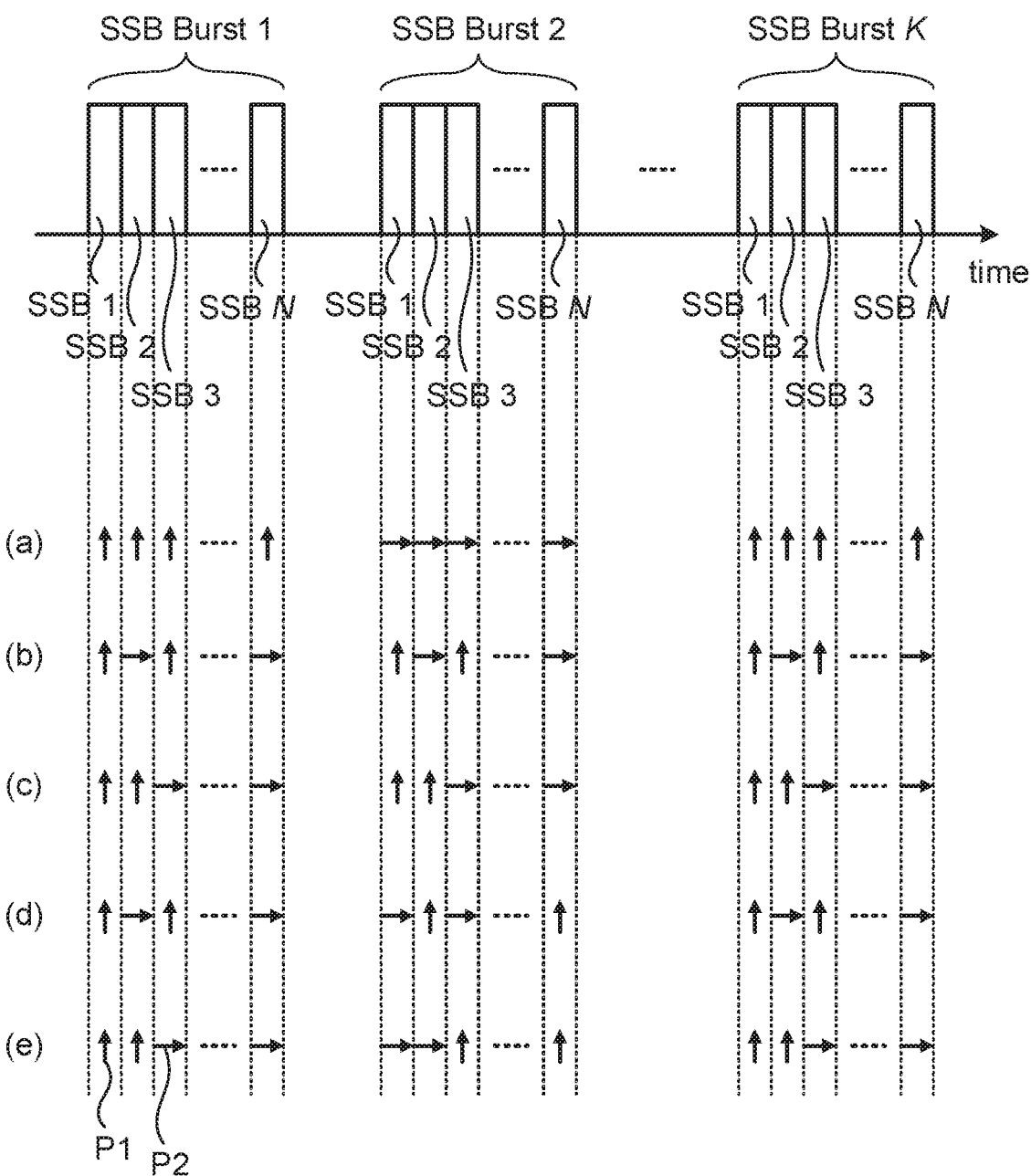
FIG. 5 schematically illustrates polarizations of SSBs according to embodiments.

FIG. 5 schematically illustrates polarizations of SSBs of K bursts of SSBs according to embodiments.

Although illustrated as occurring in order SSB 1, SSB 2, SSB 3, . . . , SSB N this order is given only for illustrative purposes and it could be that SSB n+1 is transmitted before SSB n, where 1≤n<N in each SSB burst. Regardless, the sequence according to which the polarization P1, P2, changes would remain the same as in FIG. 5; and the polarizations would then have a different mapping to the SSBs.

In general terms, FIG. 5 at (a), (b), (c), (d), and (e) illustrate five scenarios according to which the polarization of the SSBs might change; either only between consecutive bursts of SSBs (as in scenario (a)), or only between consecutive individual SSBs within each burst of SSBs (as in scenario (b)), or between both consecutive bursts of SSBs and between consecutive individual SSBs within each burst of SSBs (as in scenario (d)), or according to other rules (as in scenarios (c) and (e)).

In some aspects there is one change of polarization P1, P2 per burst of SSBs. That is according to an example, the polarization P1, P2 changes only between consecutive bursts. Accordingly, all SSBs within each burst are transmitted with same polarization P1, P2, and the SSBs of two consecutive bursts collectively are transmitted with two mutually different polarizations P1, P2. This is the case for scenario (a).

In some aspects there is a change of polarization P1, P2 for each SSB within each burst. That is, according to an example, the polarization P1, P2 changes per every SSB within each burst. Accordingly, within each burst, two consecutive SSBs collectively are transmitted with two mutually different polarizations P1, P2. This is the case for scenario (b) as well as for scenario (d).

In some aspects there is a change of polarization P1, P2 in every second beam. That is, according to an example, the polarization P1, P2 changes exactly once per pair of SSBs. Accordingly, within each burst, pairs of consecutive SSBs collectively are transmitted with two mutually different polarizations P1, P2, and the SSBs within each pair are transmitted with same polarization P1, P2. This is the case for scenario (c).

In some aspects there is a change of polarization P1, P2 in any given beam from burst to burst. That is, according to an example, the polarization P1, P2 changes per beam 160a:160N from one burst to the next burst. Accordingly, the polarization P1, P2 for each SSB in each burst is different between two consecutive bursts. This is the case for scenarios (a), (d), (e).

In some aspects there is a change of polarization P1, P2 in every beam, and a change of polarization P1, P2 in any given beam from burst to burst—scenario. That is, according to an example, within each burst, two consecutive SSBs collectively are transmitted with two mutually different polarizations P1, P2, and wherein the polarization P1, P2 for each SSB in each burst is different between two consecutive bursts. This is the case for scenario (d).

In some aspects there is a change of polarization P1, P2 in every second beam, and a change of polarization in any given beam from burst to burst. That is, according to an example, within each burst, pairs of consecutive SSBs collectively are transmitted with two mutually different polarizations P1, P2, wherein the SSBs within each pair are transmitted with same polarization P1, P2, and wherein the polarization P1, P2 for each SSB in each burst is different between two consecutive bursts. This is the case for scenario (e).

In some aspects, when considering all SSBs of two consecutive bursts of SSBs, half of the SSBs are transmitted with polarization P1 and the remaining half of the SSBs are transmitted with polarization P2.

In some aspects the network node 200 is configured to perform two-dimensional beamforming. In other words, the beams 16o might be part of a two-dimensional grid of beams. The network node 200 might then transmit two-dimensional bursts of SSBs. Particularly, in some examples, the polarized bursts of SSB are transmitted in vertically oriented beams 16o and in horizontally oriented beams 16o, whereby two-dimensional bursts of SSBs are transmitted. SSBs in beams 16o neighbouring each other in horizontal as well as in vertical orientation might collectively be transmitted with two mutually different polarizations P1, P2.

In some aspects the two mutually different polarizations P1, P2 are orthogonal with respect to each other.

The optimal value of the filter coefficient "a" in Equation 1 might be different depending on if one single polarization is used for all SSBs and all SSB bursts or if different polarizations are used between different SSBs and/or SSB bursts. In the latter case, the terminal device 150 might measure SSBs on two more or less independent radio propagation channels (assuming that SSBs transmitted with both polarizations are received by the terminal device 150), which means that it might be more optimal to increase the value of "a" compared to if only a single polarization is used for the transmission of the SSB. That is, in some aspects the value of "a" is changed such that the cell-selection criteria is calculated with more consideration to previous measurements when the herein disclosed embodiments are used for transmission of synchronization signals, such as SSBs.

Figure 6:
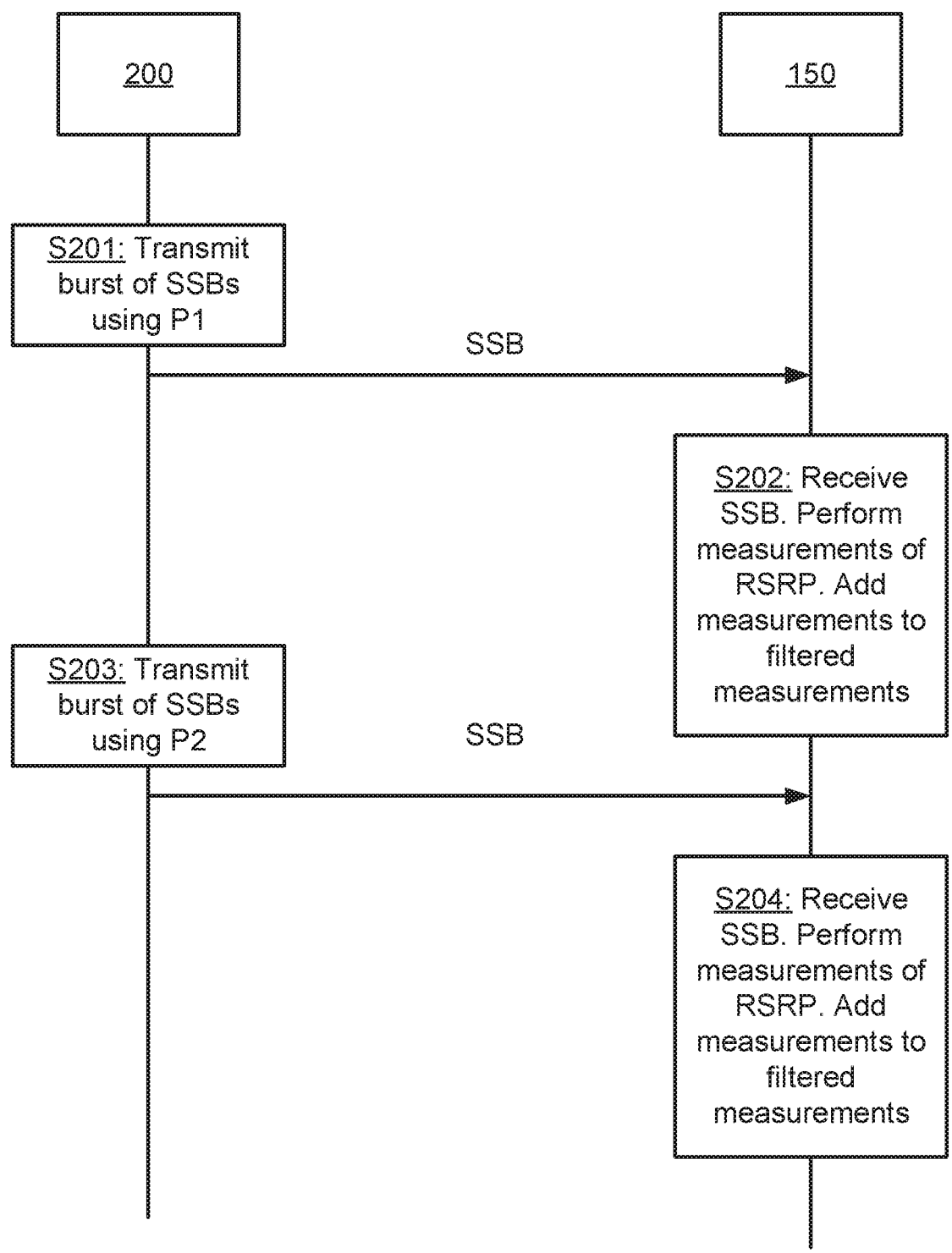
FIG. 6 is a signalling diagram of a method according to an embodiment.

One particular embodiment for transmission of synchronization signals as performed by the network node 200 will now be disclosed with reference to the signalling diagram of FIG. 6. S201: The network node 200 transmits a burst of SSBs using a first polarization P1.

One way to implement step S201 is to perform step S102.

S202: The terminal device 150 receives the SSB and performs measurements of RSRP on the SSS of the SSB. The terminal device 150 then adds the latest measurements to the filtered mobility measurements using Equation 1 with "a" modified as disclosed above.

S203: The network node 200 transmits the next SSB burst, but changes the polarization to a second polarization P2 that is orthogonal to the first polarization P1.

One way to implement step S203 is to perform step S102.

S204: The terminal device 150 receives the SSB and performs measurements of RSRP on the SSS of the SSB. The terminal device 150 then adds the latest measurements to the filtered mobility measurements using Equation 1 with "a" modified as disclosed above.

Step S201 might then be entered again.

In view of the above, the transmission of synchronization signals is here thus based on scenario (a) of FIG. 5. However, the skilled person would, in view of the present disclosure, understand how to modify the method defined by steps S201-S204 for each respective scenario (b), (c), (d), and (e) of FIG. 5.

Figure 7:
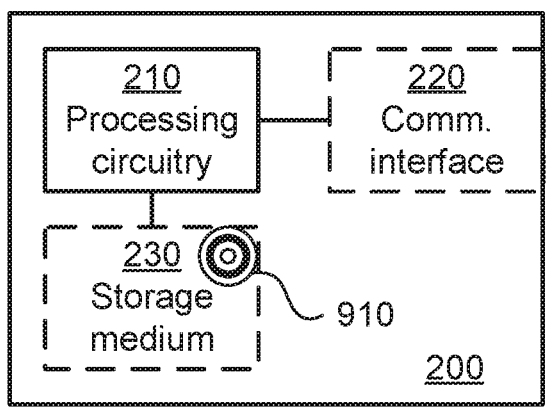
FIG. 7 is a schematic diagram showing functional units of a network node 200 according to an embodiment.

FIG. 7 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 910 (as in FIG. 9), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or steps, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The network node 200 may further comprise a communications interface 220 at least configured for communications with other entities, functions, nodes and devices of the communications network 100a, 100b. As such the communications interface 220 may comprise one or more transmitters and receivers, comprising analogue and digital components. The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 8:
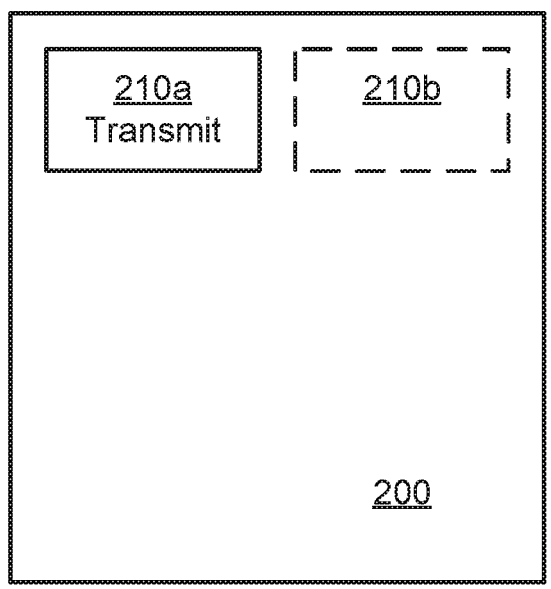
FIG. 8 is a schematic diagram showing functional modules of a network node 200 according to an embodiment.

FIG. 8 schematically illustrates, in terms of a number of functional modules, the components of a network node 200 according to an embodiment. The network node 200 of FIG. 8 comprises a transmit module 210a configured to perform step S102. The network node 200 of FIG. 8 may further comprise a number of optional functional modules as schematically illustrated by functional module 210b. In general terms, each functional module 210a-210b may in one embodiment be implemented only in hardware and in another embodiment with the help of software, i.e., the latter embodiment having computer program instructions stored on the storage medium 230 which when run on the processing circuitry makes the network node 200 perform the corresponding steps mentioned above in conjunction with FIG. 8. It should also be mentioned that even though the modules correspond to parts of a computer program, they do not need to be separate modules therein, but the way in which they are implemented in software is dependent on the programming language used. Preferably, one or more or all functional modules 210a-210b may be implemented by the processing circuitry 210, possibly in cooperation with the communications interface 220 and/or the storage medium 230. The processing circuitry 210 may thus be configured to from the storage medium 230 fetch instructions as provided by a functional module 210a-210b and to execute these instructions, thereby performing any steps as disclosed herein.

The network node 200 may be provided as a standalone device or as a part of at least one further device. For example, the network node 200 may be provided in a node of the radio access network 110 or in a node of the core network 120. Alternatively, functionality of the network node 200 may be distributed between at least two devices, or nodes. These at least two nodes, or devices, may either be part of the same network part (such as the radio access network 110 or the core network 120) or may be spread between at least two such network parts. In general terms, instructions that are required to be performed in real time may be performed in a device, or node, operatively closer to the cell than instructions that are not required to be performed in real time.

Thus, a first portion of the instructions performed by the network node 200 may be executed in a first device, and a second portion of the of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 7 the processing circuitry 210 may be distributed among a plurality of devices, or nodes. The same applies to the functional modules 210a-210b of FIG. 8 and the computer program 920 of FIG. 9.

Figure 9:
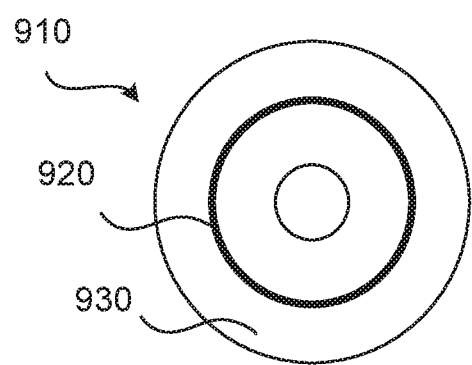
FIG. 9 shows one example of a computer program product comprising computer readable storage medium according to an embodiment.

FIG. 9 shows one example of a computer program product 910 comprising computer readable storage medium 930. On this computer readable storage medium 930, a computer program 920 can be stored, which computer program 920 can cause the processing circuitry 210 and thereto operatively coupled entities and devices, such as the communications interface 220 and the storage medium 230, to execute methods according to embodiments described herein. The computer program 920 and/or computer program product 910 may thus provide means for performing any steps as herein disclosed.

In the example of FIG. 9, the computer program product 910 is illustrated as an optical disc, such as a CD (compact disc) or a DVD (digital versatile disc) or a Blu-Ray disc. The computer program product 910 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920 is here schematically shown as a track on the depicted optical disk, the computer program 920 can be stored in any way which is suitable for the computer program product 910.

Figure 1:
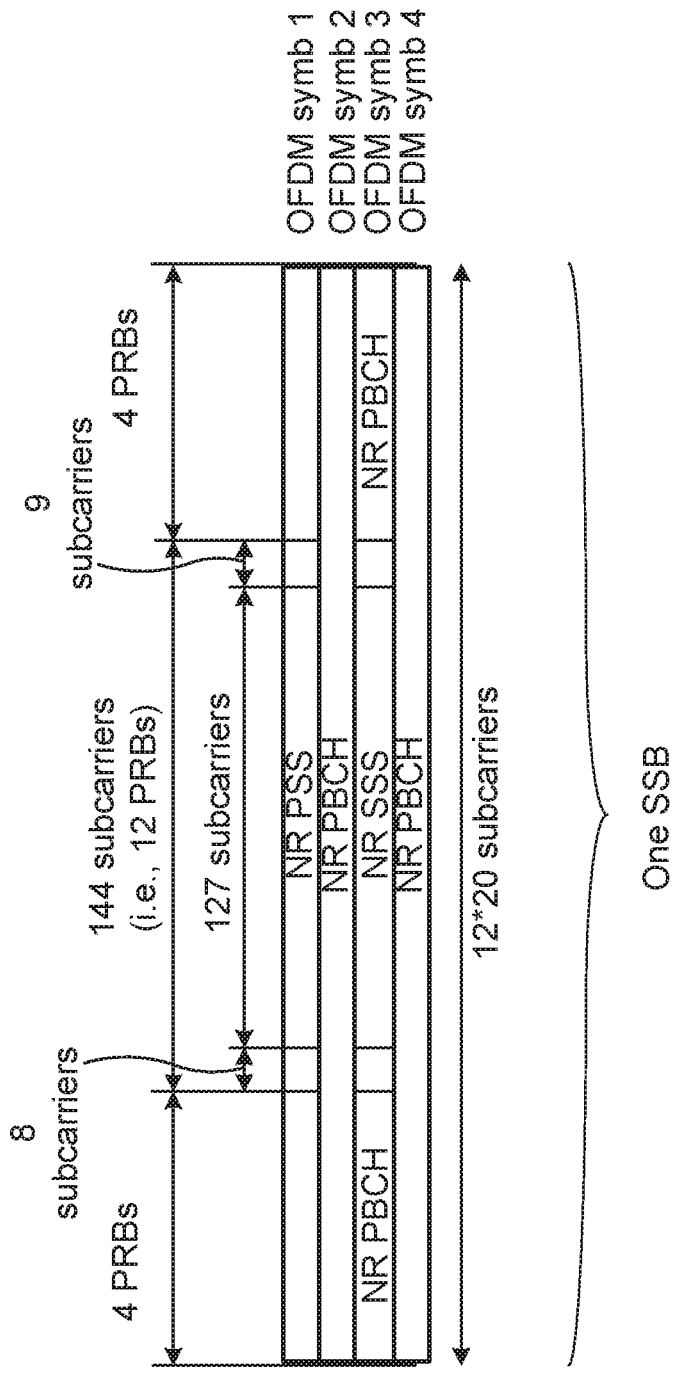
FIG. 1 schematically illustrates time/frequency resources for one SSB.
Figure 10:
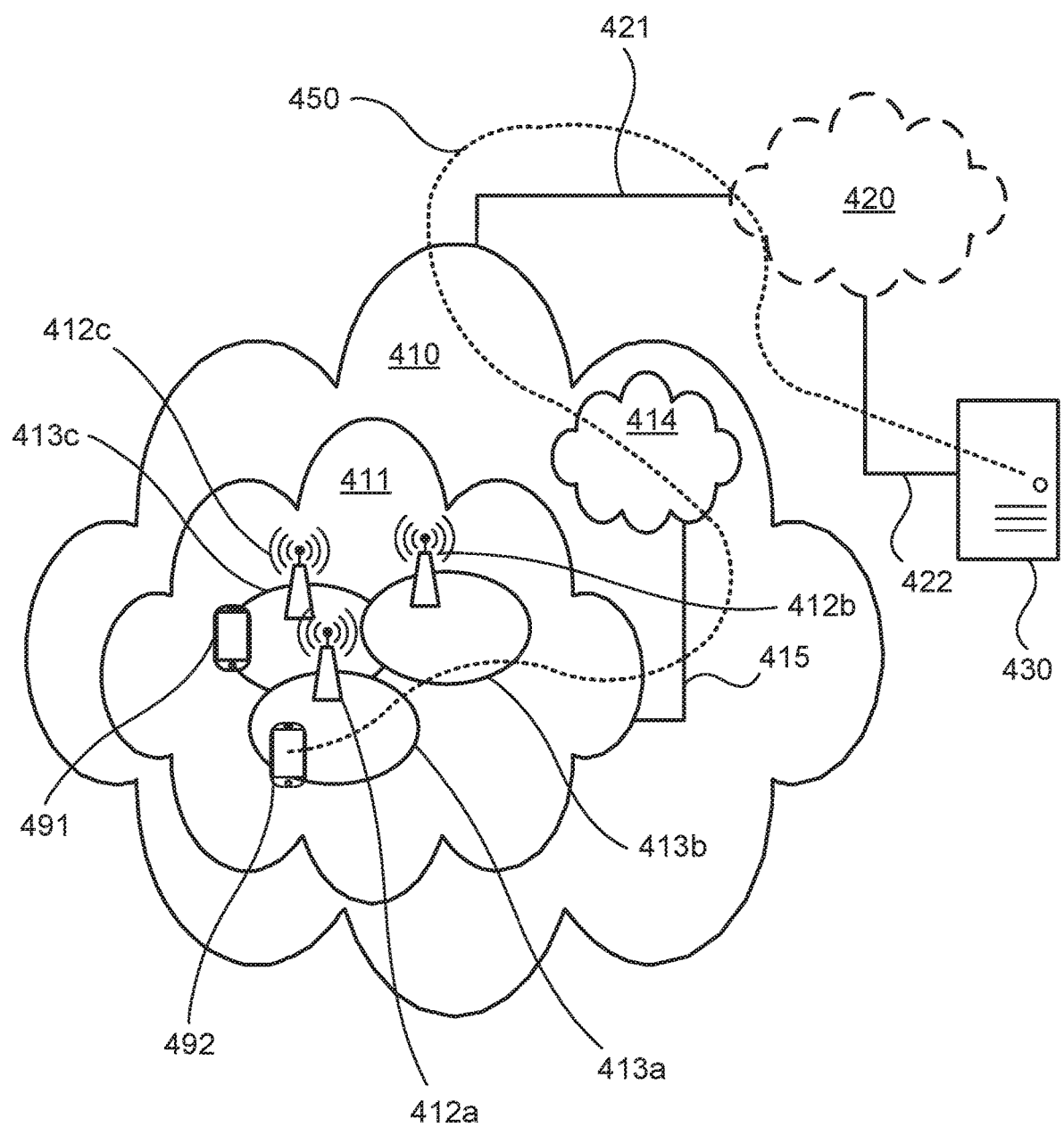
FIG. 10 is a schematic diagram illustrating a telecommunication network connected via an intermediate network to a host computer in accordance with some embodiments.

FIG. 10 is a schematic diagram illustrating a telecommunication network connected via an intermediate network 420 to a host computer 430 in accordance with some embodiments. In accordance with an embodiment, a communication system includes telecommunication network 410, such as a 3GPP-type cellular network, which comprises access network 411, such as radio access network 110 in FIG. 1, and core network 414, such as core network 120 in FIG. 1. Access network 411 comprises a plurality of radio access network nodes 412a, 412b, 412c, such as NBs, eNBs, gNBs (each corresponding to the network node 200 of FIG. 1) or other types of wireless access points, each defining a corresponding coverage area, or cell, 413a, 413b, 413c. Each radio access network nodes 412a, 412b, 412c is connectable to core network 414 over a wired or wireless connection 415. A first UE 491 located in coverage area 413c is configured to wirelessly connect to, or be paged by, the corresponding network node 412c. A second UE 492 in coverage area 413a is wirelessly connectable to the corresponding network node 412a. While a plurality of UE 491, 492 are illustrated in this example, the disclosed embodiments are equally applicable to a situation where a sole UE is in the coverage area or where a sole terminal device is connecting to the corresponding network node 412. The UEs 491, 492 correspond to the terminal device 150 of FIG. 1.

Telecommunication network 410 is itself connected to host computer 430, which may be embodied in the hardware and/or software of a standalone server, a cloud-implemented server, a distributed server or as processing resources in a server farm.

Host computer 430 may be under the ownership or control of a service provider, or may be operated by the service provider or on behalf of the service provider.

Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 10 as a whole enables connectivity between the connected UEs 491, 492 and host computer 430. The connectivity may be described as an over-the-top (OTT) connection 450. Host computer 430 and the connected UEs 491, 492 are configured to communicate data and/or signalling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, network node 412 may not or need not be informed about the past routing of an incoming downlink communication with data originating from host computer 430 to be forwarded (e.g., handed over) to a connected UE 491. Similarly, network node 412 need not be aware of the future routing of an outgoing uplink communication originating from the UE 491 towards the host computer 430.

Figure 11:
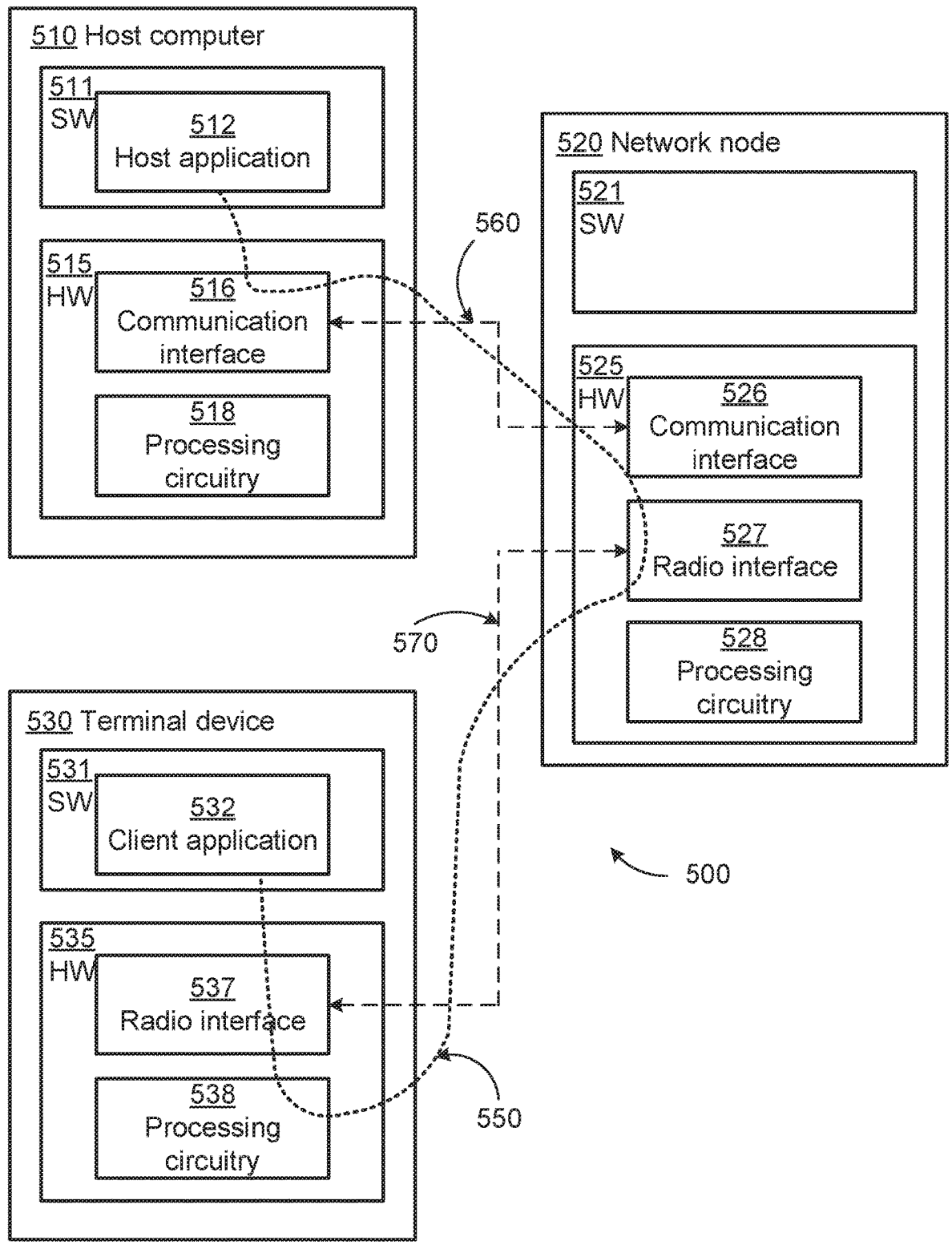
FIG. 11 is a schematic diagram illustrating host computer communicating via a radio base station with a terminal device over a partially wireless connection in accordance with some embodiments.

FIG. 11 is a schematic diagram illustrating host computer communicating via a radio access network node with a UE over a partially wireless connection in accordance with some embodiments. Example implementations, in accordance with an embodiment, of the UE, radio access network node and host computer discussed in the preceding paragraphs will now be described with reference to FIG. 11. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. The UE 530 corresponds to the terminal device 150 of FIG. 1. In providing the service to the remote user, host application 512 may provide user data which is transmitted using OTT connection 550.

Communication system 500 further includes radio access network node 520 provided in a telecommunication system and comprising hardware 525 enabling it to communicate with host computer 510 and with UE 530. The radio access network node 520 corresponds to the network node 200 of FIG. 1. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 11) served by radio access network node 520. Communication interface 526 may be configured to facilitate connection 56o to host computer 510. Connection 56o may be direct or it may pass through a core network (not shown in FIG. 11) of the telecommunication system and/or through one or more intermediate networks outside the telecommunication system. In the embodiment shown, hardware 525 of radio access network node 520 further includes processing circuitry 528, which may comprise one or more programmable processors, application-specific integrated circuits, field programmable gate arrays or combinations of these (not shown) adapted to execute instructions. Radio access network node 520 further has software 521 stored internally or accessible via an external connection.

Communication system 500 further includes UE 530 already referred to. Its hardware 535 may include radio interface 537 configured to set up and maintain wireless connection 570 with a radio access network node serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, radio access network node 520 and UE 530 illustrated in FIG. 11 may be similar or identical to host computer 430, one of network nodes 412a, 412b, 412e and one of UEs 491, 492 of FIG. 10, respectively. This is to say, the inner workings of these entities may be as shown in FIG. 11 and independently, the surrounding network topology may be that of FIG. 10.

In FIG. 11, OTT connection 550 has been drawn abstractly to illustrate the communication between host computer 510 and UE 530 via network node 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and radio access network node 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may reduce interference, due to improved classification ability of airborne UEs which can generate significant interference.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect network node 520, and it may be unknown or imperceptible to radio access network node 520. Such procedures and functionalities may be known and practiced in the art. In certain embodiments, measurements may involve proprietary UE signalling facilitating host computer's 510 measurements of throughput, propagation times, latency and the like. The measurements may be implemented in that software 511 and 531 causes messages to be transmitted, in particular empty or 'dummy' messages, using OTT connection 550 while it monitors propagation times, errors etc.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for transmission of synchronization signals, the method being performed by a network node, the method comprising:
   transmitting a first synchronization signal block (SSB) included in a first polarized burst of SSBs using a first beam and a first polarization;
   transmitting a second SSB included in the first polarized burst of SSBs using a second beam and a second polarization;
   transmitting a third SSB included in a second polarized burst of SSBs using the first beam and a third polarization; and
   transmitting a fourth SSB included in the second polarized burst of SSBs using the second beam and a fourth polarization, wherein
   (i) the first and third polarizations are the same, the second and fourth polarizations are the same, and polarizations of the first and second polarized bursts are the same,
   (ii) the first, second, third, and fourth polarizations are the same, and polarizations of the first and second polarized bursts are the same,
   (iii) the first and fourth polarizations are the same, and the second and third polarizations are the same, and polarizations of the first and second polarized bursts are opposite, or
   (iv) the first and second polarizations are the same, the third and fourth polarizations are the same, and polarizations of the first and second polarized bursts are opposite.

2. The method of claim 1, wherein SSBs of two consecutive bursts are transmitted with two mutually different polarizations.

3. The method of claim 1, wherein, within each burst, two consecutive SSBs collectively are transmitted with two mutually different polarizations.

4. The method of claim 1, wherein, within each burst, pairs of consecutive SSBs collectively are transmitted with two mutually different polarizations, and wherein the SSBs within each pair are transmitted with the same polarization.

5. The method of claim 1, wherein the polarization for each SSB in each burst is different between two consecutive bursts.

6. The method of claim 1, wherein, within each burst, two consecutive SSBs collectively are transmitted with two mutually different polarizations, and wherein the polarization for each SSB in each burst is different between two consecutive bursts.

7. The method of claim 6, wherein SSBs in beams neighboring each other in horizontal as well as in vertical orientation collectively are transmitted with two mutually different polarizations.

8. The method of claim 1, wherein, within each burst, pairs of consecutive SSBs collectively are transmitted with two mutually different polarizations, wherein the SSBs within each pair are transmitted with same polarization, and wherein the polarization for each SSB in each burst is different between two consecutive bursts.

9. The method of claim 1, wherein the polarized bursts of SSB are transmitted in vertically oriented beams and in horizontally oriented beams, whereby two-dimensional bursts of SSBs are transmitted.

10. The method of claim 1, wherein
    a plurality of beams having a plurality of beam directions are used for transmitting SSBs included in the first polarized burst of SSBs and the second polarized burst of SSBs,
    and
    among the plurality of beam directions, a beam direction of the second beam is closest to a beam direction of the first beam.

11. The method of claim 1, wherein
    the first polarized burst of SSBs comprises fifth SSB,
    the second polarized burst of SSBs comprises a sixth SSB,
    the fifth SSB is transmitted using a third beam and a fifth polarization,
    the sixth SSB is transmitted using the third beam and a sixth polarization,
    the first polarization and the fifth polarization are the same, and
    the third polarization and the sixth polarization are the same.

12. The method of claim 1, wherein
    the first polarized burst of SSBs comprises a fifth SSB,
    the second polarized burst of SSBs comprises a sixth SSB,
    the fifth SSB is transmitted using a third beam and a fifth polarization,
    the sixth SSB is transmitted using the third beam and a sixth polarization,
    the first polarization and the fifth polarization are opposite,
    the third polarization and the sixth polarization are opposite.

13. A network node for transmission of synchronization signals, the network node comprising processing circuitry, the processing circuitry being configured to cause the network node to:
    transmit a first synchronization signal block (SSB) included in a first polarized burst of SSBs using a first beam and a first polarization;

transmit a second SSB included in the first polarized burst of SSBs using a second beam and a second polarization;

transmit a third SSB included in a second polarized burst of SSBs using the first beam and a third polarization; and transmit a fourth SSB included in the second polarized burst of SSBs using the second beam and a fourth polarization, wherein (i) the first and third polarizations are the same, the second and fourth polarizations are the same, and polarizations of the first and second polarized bursts are the same, (ii) the first, second, third, and fourth polarizations are the same, and polarizations of the first and second polarized bursts are the same, (iii) the first and fourth polarizations are the same, and the second and third polarizations are the same, and polarizations of the first and second polarized bursts are opposite, or (iv) the first and second polarizations are the same, the third and fourth polarizations are the same, and polarizations of the first and second polarized bursts are opposite.

14. The network node of claim 13, wherein the processing circuitry is configured to cause the network node to transmit SSBs in one or more of the following ways:

SSBs of two consecutive bursts are transmitted with two mutually different polarizations, within each burst, two consecutive SSBs collectively are transmitted with two mutually different polarizations, within each burst, pairs of consecutive SSBs collectively are transmitted with two mutually different polarizations, and wherein the SSBs within each pair are transmitted with the same polarization, the polarization for each SSB in each burst is different between two consecutive bursts, within each burst, two consecutive SSBs collectively are transmitted with two mutually different polarizations, and wherein the polarization for each SSB in each burst is different between two consecutive bursts, or within each burst, pairs of consecutive SSBs collectively are transmitted with two mutually different polarizations, wherein the SSBs within each pair are transmitted with same polarization, and wherein the polarization for each SSB in each burst is different between two consecutive bursts.

15. A computer program product comprising a non-transitory computer readable medium storing a computer program for transmission of synchronization signals, the computer program comprising computer code which, when run on processing circuitry of a network node, causes the network node to:

transmit a first synchronization signal block (SSB) included in a first polarized burst of SSBs using a first beam and a first polarization;

transmit a second SSB included in the first polarized burst of SSBs using a second beam and a second polarization;

transmit a third SSB included in a second polarized burst of SSBs using the first beam and a third polarization; and transmit a fourth SSB included in the second polarized burst of SSBs using the second beam and a fourth polarization, wherein (i) the first and third polarizations are the same, the second and fourth polarizations are the same, and polarizations of the first and second polarized bursts are the same, (ii) the first, second, third, and fourth polarizations are the same, and polarizations of the first and second polarized bursts are the same, (iii) the first and fourth polarizations are the same, and the second and third polarizations are the same, and polarizations of the first and second polarized bursts are opposite, or (iv) the first and second polarizations are the same, the third and fourth polarizations are the same, and polarizations of the first and second polarized bursts are opposite.

16. A method performed by a user equipment (UE), the method comprising:

receiving a first synchronization signal block (SSB) included in a first polarized burst of SSBs using a first beam and a first polarization;

receiving a second SSB included in the first polarized burst of SSBs using a second beam and a second polarization;

receiving a third SSB included in a second polarized burst of SSBs using the first beam and a third polarization; and receiving a fourth SSB included in the second polarized burst of SSBs using the second beam and a fourth polarization;

performing measurements of received SSBs including the first, second, third, and fourth SSBs;

creating report data using the measurements; and transmitting towards a network node the report data, wherein (i) the first and third polarizations are the same, the second and fourth polarizations are the same, and polarizations of the first and second polarized bursts are the same, (ii) the first, second, third, and fourth polarizations are the same, and polarizations of the first and second polarized bursts are the same, (iii) the first and fourth polarizations are the same, and the second and third polarizations are the same, and polarizations of the first and second polarized bursts are opposite, or (iv) the first and second polarizations are the same, the third and fourth polarizations are the same, and polarizations of the first and second polarized bursts are opposite.

17. The method of claim 16, wherein creating the report data comprises:

averaging the measurements of the received SSB; and determining a measurement value for a transmit beam of the network node based on the averaged measurements.

* * * * *